(12) United States Patent
Wahlberg et al.

(10) Patent No.: US 8,050,628 B2
(45) Date of Patent: Nov. 1, 2011

(54) SYSTEMS AND METHODS FOR MITIGATING RADIO RELAY LINK INTERFERENCE IN MOBILE SATELLITE COMMUNICATIONS

(75) Inventors: Per Wahlberg, Nacka (SE); Kennet Lejnell, Ekero (SE)

(73) Assignee: M.N.C. Microsat Networks (Cyprus) Limited, Nicosia (CY)

( * ) Notice: Subject to any disclaimer, the term of this patent is extended or adjusted under 35 U.S.C. 154(b) by 750 days.

(21) Appl. No.: 11/779,242

(22) Filed: Jul. 17, 2007

(65) Prior Publication Data

US 2009/0021424 A1 Jan. 22, 2009

(51) Int. Cl.
*H04B 1/00* (2006.01)
*H04B 15/00* (2006.01)

(52) U.S. Cl. ............... 455/63.1; 455/21.1; 455/11.1; 455/427; 455/13.2; 455/404.2; 455/456.1; 342/359; 342/357.09; 370/236

(58) Field of Classification Search .......... 455/12.1, 455/11.1, 115.1, 121, 120, 67.13, 67.11, 455/63.1, 427, 404.2, 456.1, 13.1–13.2; 342/359, 342/357.09; 370/236
See application file for complete search history.

(56) References Cited

U.S. PATENT DOCUMENTS

| | | | |
|---|---|---|---|
| 4,345,256 A | | 8/1982 | Rainwater |
| 4,796,032 A | * | 1/1989 | Sakurai et al. ............... 342/359 |
| 5,506,780 A | | 4/1996 | Montenbruck et al. |
| 5,566,354 A | | 10/1996 | Sehloemer |
| 5,590,395 A | * | 12/1996 | Diekelman ............... 455/13.1 |
| 5,678,174 A | * | 10/1997 | Tayloe ............... 455/13.1 |
| 5,736,959 A | | 4/1998 | Patterson et al. |
| 5,765,098 A | | 6/1998 | Bella |
| 5,805,067 A | | 9/1998 | Bradley et al. |
| 5,819,185 A | * | 10/1998 | Umezawa et al. ......... 455/575.1 |
| 5,894,590 A | * | 4/1999 | Vatt et al. ............... 455/12.1 |
| 5,896,558 A | | 4/1999 | Wiedeman |
| 5,925,092 A | | 7/1999 | Swan et al. |
| 5,995,841 A | | 11/1999 | King et al. |
| 6,018,659 A | * | 1/2000 | Ayyagari et al. ............. 455/431 |

(Continued)

FOREIGN PATENT DOCUMENTS

EP 858176 8/1998

(Continued)

OTHER PUBLICATIONS

International Search Report issued in connection with International application No. PCT/EP2008/005723.

(Continued)

*Primary Examiner* — Marceau Milord
(74) *Attorney, Agent, or Firm* — White & Case LLP

(57) ABSTRACT

Systems and methods according to embodiment of the present invention prevent or otherwise mitigate data corruption and interference that may result when a communications on-the-move transmission is blocked by a radio relay link antenna transmitting on a shared frequency band. Harmful radiation that could affect persons blocking the line-of-sight of a COTM transmission is also prevented or mitigated. According to one embodiment of the present invention, if a building or other obstruction blocks the line-of-sight between a COTM antenna and a target satellite, the transmission will automatically cease, preventing or minimizing any potential interference that can occur, such as the interference to a radio relay link antenna operating atop a building. Similarly, persons who may have been in the line-of-sight will not be subjected to harmful radiation. COTM transmission remains offline until free line-of-sight is re-established.

23 Claims, 2 Drawing Sheets

U.S. PATENT DOCUMENTS

| | | | |
|---|---|---|---|
| 6,021,309 A | 2/2000 | Sherman et al. | |
| 6,023,606 A | 2/2000 | Monte et al. | |
| 6,032,041 A | 2/2000 | Wainfan et al. | |
| 6,067,442 A | 5/2000 | Wiedeman et al. | |
| 6,072,768 A | 6/2000 | Wiedeman et al. | |
| 6,088,572 A * | 7/2000 | Vatt et al. | 455/13.1 |
| 6,097,957 A | 8/2000 | Bonta et al. | |
| 6,101,385 A | 8/2000 | Monte et al. | |
| 6,125,261 A | 9/2000 | Anselmo et al. | |
| 6,128,487 A | 10/2000 | Wiedeman | |
| 6,147,640 A | 11/2000 | Wachs | |
| 6,160,994 A | 12/2000 | Wiedeman | |
| 6,169,881 B1 * | 1/2001 | Astrom et al. | 455/12.1 |
| 6,188,896 B1 * | 2/2001 | Perahia et al. | 455/428 |
| 6,198,907 B1 * | 3/2001 | Torkington et al. | 455/12.1 |
| 6,222,499 B1 | 4/2001 | Goetz et al. | |
| 6,236,834 B1 | 5/2001 | Poskett et al. | |
| 6,246,874 B1 | 6/2001 | Voce | |
| 6,275,677 B1 | 8/2001 | Tandler | |
| 6,324,381 B1 | 11/2001 | Anselmo et al. | |
| 6,339,707 B1 | 1/2002 | Wainfan et al. | |
| 6,400,927 B1 * | 6/2002 | Daniel et al. | 455/13.1 |
| 6,408,178 B1 * | 6/2002 | Wickstrom et al. | 455/427 |
| 6,442,480 B1 * | 8/2002 | Takahashi | 701/213 |
| 6,459,898 B1 | 10/2002 | Yegenoglu et al. | |
| 6,463,279 B1 | 10/2002 | Sherman et al. | |
| 6,538,612 B1 | 3/2003 | King | |
| 6,570,859 B1 | 5/2003 | Cable et al. | |
| 6,574,794 B1 | 6/2003 | Sarraf | |
| 6,594,469 B1 | 7/2003 | Serri et al. | |
| 6,594,706 B1 | 7/2003 | DeCoursey et al. | |
| 6,678,520 B1 * | 1/2004 | Wang | 455/428 |
| 6,704,543 B1 | 3/2004 | Sharon et al. | |
| 6,708,029 B2 | 3/2004 | Wesel | |
| 6,731,909 B2 * | 5/2004 | McLain et al. | 455/67.13 |
| 6,735,440 B2 | 5/2004 | Wiedeman et al. | |
| 6,791,960 B1 * | 9/2004 | Song | 370/335 |
| 6,804,514 B2 | 10/2004 | Wiedeman et al. | |
| 6,859,652 B2 * | 2/2005 | Karabinis et al. | 455/427 |
| 6,866,231 B2 * | 3/2005 | Higgins | 244/158.4 |
| 6,879,829 B2 | 4/2005 | Dutta et al. | |
| 7,110,880 B2 * | 9/2006 | Breed et al. | 701/207 |
| 7,136,620 B2 * | 11/2006 | Wang | 455/13.1 |
| 7,271,737 B1 * | 9/2007 | Hoffberg | 340/905 |
| 7,295,925 B2 * | 11/2007 | Breed et al. | 701/301 |
| 7,298,289 B1 * | 11/2007 | Hoffberg | 340/903 |
| 7,313,404 B2 * | 12/2007 | Anderson | 455/456.1 |
| 7,418,346 B2 * | 8/2008 | Breed et al. | 701/301 |
| 7,426,437 B2 * | 9/2008 | Breed et al. | 701/301 |
| 7,450,901 B2 * | 11/2008 | Parkman | 455/12.1 |
| 7,460,830 B2 * | 12/2008 | Moore, III | 455/13.2 |
| 7,466,218 B2 * | 12/2008 | Oesterling | 340/426.18 |
| 7,526,249 B2 * | 4/2009 | Waltman et al. | 455/12.1 |
| 7,577,400 B2 * | 8/2009 | Karabinis et al. | 455/12.1 |
| 7,627,284 B2 * | 12/2009 | Wang | 455/13.1 |
| 7,629,899 B2 * | 12/2009 | Breed | 340/903 |
| 7,660,652 B2 * | 2/2010 | Smith et al. | 701/35 |
| 7,711,375 B2 * | 5/2010 | Liu | 455/456.1 |
| 7,962,134 B2 * | 6/2011 | Wahlberg et al. | 455/427 |
| 2001/0045494 A1 | 11/2001 | Higgins | |
| 2003/0017803 A1 | 1/2003 | Rubin et al. | |
| 2003/0054760 A1 | 3/2003 | Karabinis | |
| 2003/0207684 A1 | 11/2003 | Wesel | |
| 2004/0038644 A1 | 2/2004 | Jimenez et al. | |
| 2004/0157554 A1 | 8/2004 | Wesel | |
| 2004/0203444 A1 | 10/2004 | Jarett | |
| 2005/0085186 A1 | 4/2005 | Sandrin | |
| 2005/0197060 A1 | 9/2005 | Hedinger et al. | |
| 2007/0167132 A1 | 7/2007 | Wahlberg et al. | |
| 2007/0168675 A1 | 7/2007 | Wahlberg et al. | |
| 2007/0178833 A1 | 8/2007 | Wahlberg et al. | |
| 2007/0178834 A1 | 8/2007 | Wahlberg et al. | |
| 2008/0045146 A1 | 2/2008 | Wahlberg et al. | |
| 2009/0021424 A1 | 1/2009 | Wahlberg et al. | |
| 2009/0022088 A1 | 1/2009 | Wahlberg et al. | |
| 2010/0309042 A1 * | 12/2010 | Colley et al. | 342/357.3 |

FOREIGN PATENT DOCUMENTS

| | | |
|---|---|---|
| EP | 915529 | 5/1999 |
| EP | 1065806 | 1/2001 |
| EP | 1117198 | 7/2001 |
| EP | 1223691 | 7/2002 |
| EP | 1014598 | 10/2004 |
| GB | 2313743 | 12/1997 |
| GB | 2341762 | 3/2000 |
| JP | 62-084604 | 4/1987 |
| JP | 09-153718 | 6/1997 |
| JP | 10-178313 | 6/1998 |
| JP | 2001-007637 | 1/2001 |
| WO | WO-96/31016 | 10/1996 |
| WO | WO-97/25785 | 7/1997 |
| WO | WO-98/20634 | 5/1998 |
| WO | WO-00/28678 | 5/2000 |
| WO | WO-01/26251 | 4/2001 |
| WO | WO-01/37588 | 5/2001 |
| WO | WO-02/27975 | 4/2002 |
| WO | WO-02/27976 | 4/2002 |
| WO | WO-03/026328 | 3/2003 |
| WO | WO-2005/093967 | 10/2005 |
| WO | WO-2007/000794 | 1/2007 |
| WO | WO-2007/064094 | 6/2007 |
| WO | WO-2007/067016 | 6/2007 |
| WO | WO-2007/082719 | 7/2007 |
| WO | WO-2007/082720 | 7/2007 |
| WO | WO-2007/082721 | 7/2007 |
| WO | WO-2007/082722 | 7/2007 |
| WO | WO-2007/090506 | 8/2007 |
| WO | WO-2009/010253 | 1/2009 |
| WO | WO-2009/010254 | 1/2009 |
| WO | WO-2009/039998 | 4/2009 |

OTHER PUBLICATIONS

Written Opinion issued in connection with International application No. PCT/EP2008/005723.

Bell, K. D. et al: "Balancing Performance and Cost for Cost-Effective Satellite Systems Design Using an Integrated Cost Engineering Model," Aerospace Applications Conference, 1995. Proceedings., 1995 IEEE Aspen Co., pp. 153-167.

Gordon, Morgan: "Principles of Communications Satellites" 1993.

Maryann Lawlor, Network-Centric Operations Go on the Road, Signal, Oct. 2005.

Phil Hochmuth, Cisco in Space, Network World, Oct. 31, 2005.

Rainger et al: "Satellite Broadcasting," 1985, pp. 267-279.

Robert A. Nelson, Antennas: The Interface with Space, Via Satellite, Sep. 1999.

International Search Report issued in International Patent Application No. PCT/EP2007/000361.

Written Opinion issued in International Patent Application No. PCT/EP2007/000361.

International Search Report issued in International Patent Application No. PCT/EP2007/000362.

Written Opinion issued in International Patent Application No. PCT/EP2007/000362.

International Search Report issued in International Patent Application No. PCT/EP2007/000363.

Written Opinion issued in International Patent Application No. PCT/EP2007/000363.

International Search Report issued in International Patent Application No. PCT/EP07/000364.

Written Opinion issued in International Patent Application No. PCT/EP07/000364.

International Search Report issued in International Patent Application No. PCT/EP2007/000365.

Written Opinion issued in International Patent Application No. PCT/EP2007/000365.

International Search Report issued in International Patent Application No. PCT/EP2008/005722.

Written Opinion issued in International Patent Application No. PCT/EP2008/005722.

International Search Report issued in International Patent Application No. PCT/EP2008/005723.

Written Opinion issued in International Patent Application No. PCT/EP2008/005723.

Invitation to Pay Additional Fees and partial international search results issued in International Patent Application No. PCT/EP2008/007548.

Written Opinion issued in International Patent Application No. PCT/EP2008/007548.

COTM: a top priority for the military, www.satellite-evolution.com, Sep.-Oct. 2008, pp. 48-52.

DRS, Defense Solutions, X-38V Low Profile Communications On-The-Move Antenna System, Mar. 2011.

* cited by examiner

SYSTEMS AND METHODS FOR MITIGATING RADIO RELAY LINK INTERFERENCE IN MOBILE SATELLITE COMMUNICATIONS

FIELD OF THE INVENTION

This invention relates to systems and methods for satellite communications.

BACKGROUND OF THE INVENTION

Operating satellite communications on-the-move ("COTM") terminals in a frequency band that is shared by both satellite communications services and terrestrial radio relay links may lead to interference between the two services. An example of such an interference problem is illustrated in FIG. 1. As a vehicle equipped with a COTM antenna and transmitter 100 moves through an urban area, an antenna from a radio relay link on the roof of a building 102 may block the line-of-sight 106 between the COTM antenna 100 and a target satellite 104. An interfering signal will then propagate into the radio relay link, potentially corrupting data and interrupting the radio relay link. As a result, many vehicles with COTM capability may be precluded from operating in urban areas where many tall buildings have radio relay link installations.

In addition, persons who block the line-of-sight between a COTM transmitter and a target satellite can be subjected to hazardous radiation.

There is, therefore, increasing but unmet demand for a method and system to prevent COTM transmissions from causing harmful interference to radio relay links, and radiation to persons.

SUMMARY OF THE INVENTION

Embodiments of systems and methods of the various aspects of the present invention mitigate (i.e., prevent, minimize, or otherwise diminish) data corruption and interference that may result when a COTM transmission is blocked by a radio relay link antenna transmitting on a shared frequency band. Another potential advantage of certain embodiments of the invention is that they tend to minimize or otherwise diminish radiation that could harm persons blocking the line-of-sight of a COTM transmission.

According to one embodiment of the present invention, if a building or other obstruction blocks the line-of-sight between a COTM antenna and a target satellite, the transmission will automatically cease, preventing or minimizing any potential interference that can occur, such as the interference to a radio relay link antenna operating atop a building. Similarly, any persons who may have been in the line-of-sight will not be subjected to harmful radiation. According to another embodiment of this aspect of the present invention, COTM transmission remains offline until free line-of-sight is re-established.

An obstruction blocking the line-of-sight between a COTM antenna and a target terminal may be detected by a variety of mechanisms in accordance with the present invention, including without limitation (i) measuring a loss in a received signal, (ii) measuring a loss in a beacon signal, (iii) measuring an increase in standing wave ratio, and/or (iv) optical detection.

In an embodiment of another aspect of the present invention, potential blockages of the line-of-sight between a COTM antenna and a target terminal are predicted in advance. Such predictions may be implemented using a software program, running on a computer, that processes a combination of data that includes, but is not necessarily limited to, (i) COTM vehicle velocity (i.e., vehicle speed and vehicle direction), (ii) COTM vehicle location, and (iii) 3-dimensional map information. In one embodiment of this aspect of the present invention, the software program calculates the risk for a blockage to appear within a preselected period of time and may transmit this information to a COTM vehicle operator. According to another of its embodiments, the software program can be used as a route planner to mitigate the blockage during COTM transportation from one location to another.

In another primary aspect, systems and methods according to the present invention comprise communication equipment to collect a variety of data to be used to assess whether an obstruction is blocking the line-of-sight between a COTM antenna and a target terminal. In one embodiment, systems and methods utilize an antenna for transmitting uplink signals and receiving downlink signals, and a connection and control board ("CCB") that is coupled to a computer and the communication equipment. The computer processes data collected by the communication equipment to send instructions to either stop or start transmission of an uplink signal to the CCB, which in turn instructs the communication equipment (e.g., via modem or amplifier) to carry out the instructions.

In yet a further embodiment of an aspect of the present invention, after an uplink transmission is initiated from an antenna, calculations are made to determine whether a line-of-sight from the antenna to a target satellite is blocked. According to one embodiment, the uplink transmission is stopped if blockage is detected. Otherwise, calculations are used to determine whether the line-of-sight will be blocked within a preselected timeframe.

BRIEF DESCRIPTION OF THE DRAWINGS

Various aspects of the systems and methods according to the present invention are described in the figures identified below and in the detailed description that follows.

DETAILED DESCRIPTION

This description, including the figures, describes embodiments that illustrate various aspects of the present invention. These embodiments are not intended to, and do not, limit the scope of the invention to particular details.

Commonly assigned and copending U.S. patent applications, identified by application Ser. Nos. 11/623,799; 11/623,821; 11/623,877; 11/623,902; and 11/623,986, all filed on Jan. 17, 2007, are incorporated herein by reference in their entirety.

The various entities identified in the Figures and described herein may each utilize one or more computer processors, and the computer processors of each entity may be configured to communicate with the computer processors of one or more of the other entities in order to carry out the methods of the present invention.

Figure 1:
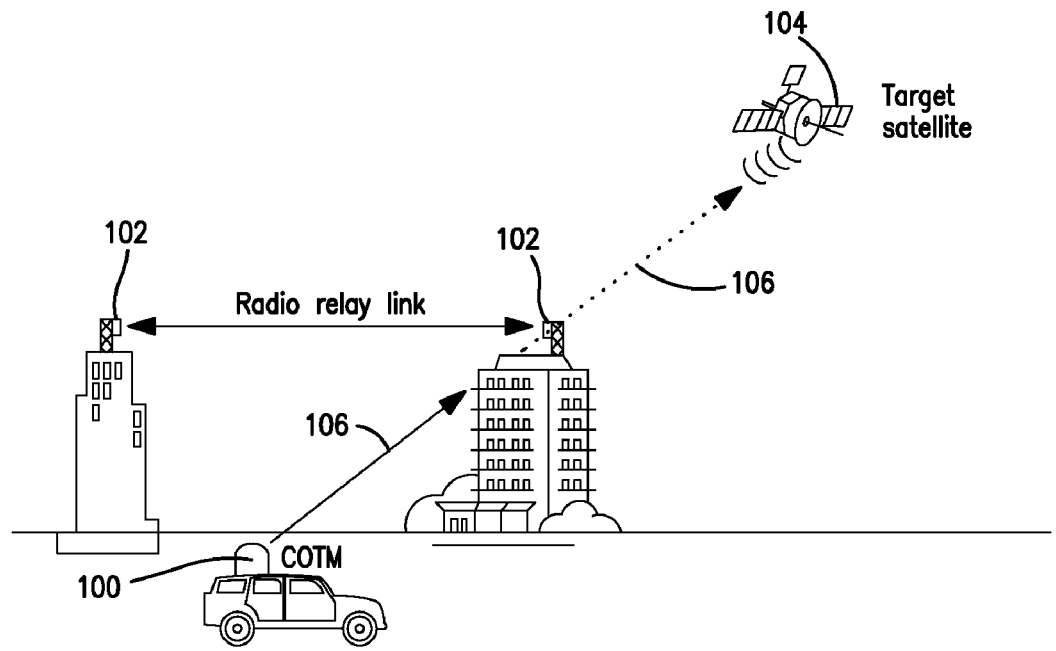
FIG. 1 shows a radio relay link antenna blocking the line-of-sight between a vehicle equipped with a COTM antenna and transmitter and a target satellite.
Figure 2:
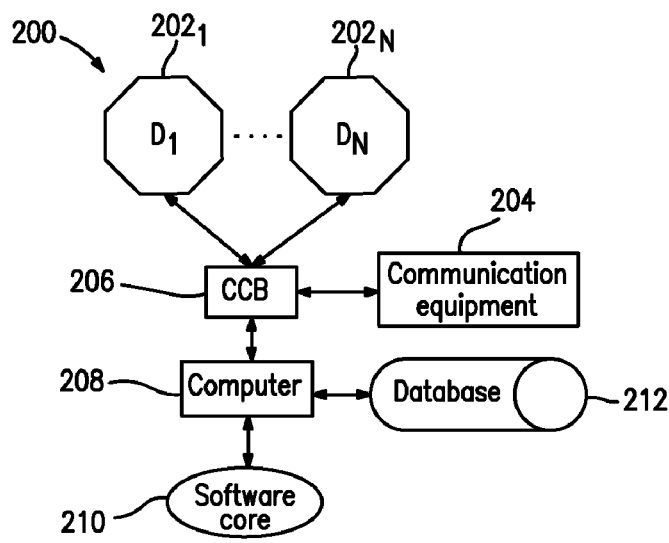
FIG. 2 shows components of system embodiments according to various aspects of the present invention.

FIG. 2 illustrates an embodiment of a blockage detection and prevention system 200 according to an aspect of the present invention. Actual blockages of COTM transmissions are detected according to a further embodiment of the present invention. The COTM communication equipment 204, which may include one or more (i) antennas, (ii) modems (that may be coupled to baseband equipment such as a computer, camera, or any device that generates a digital sequence), (iii) amplifiers, (iv) communication transmitters and receivers, (v) beacon receivers, (vi) power detectors, and (vii) sensors (e.g., optical sensors and/or vehicle sensors), transmits uplink signals to a target satellite (not shown). In one embodiment, the COTM communication equipment 204, via a power detector (not shown), monitors the reflected wave from an uplink signal. This data (e.g., signal strength measurement) is then transmitted to a connection and control board ("CCB") 206 coupled to a computer 208 that comprises or otherwise runs software 210 configured to process the reflected wave data. The software 210 may also be implemented as hardware or firmware. After the CCB 206 transmits the data to the computer 208, the software 210, when run on the computer 208, may calculate, for example, whether a standing wave ratio has increased by measuring the properties of the reflected wave, thereby determining whether the line-of-sight is blocked.

In another embodiment, the communication equipment 204, via a communication receiver and/or beacon receiver (not shown), measures a received signal. This data is then transmitted to the CCB 206, which in turn transmits the data to the computer 208. The software 210, residing in a suitable storage medium in or accessible to the computer 208, is configured to calculate any relative loss in the received signal, thereby determining whether the line-of-sight is blocked.

In yet another embodiment, the communication equipment 204, via one or more optical sensors, detects whether an obstruction is within the line-of-sight. The optical sensor 204 then transmits the data to the CCB 206, which in turn transmits the data to the computer 208. The software 210 is configured to interpret the optical sensor data to determine whether the line-of-sight is blocked.

According to another embodiment of an aspect of the present invention, one or more sensors $202_1 \ldots 202_N$ may comprise an optical sensor(s) that is distinct from the communication equipment 204 and is coupled to the CCB 206 in order to transmit data directly to the CCB 206.

In yet another embodiment of this aspect of the invention, the optical sensor(s) may comprise a camera aligned in the direction of the antenna such that at least part of the optical window covers the line-of-sight. It is also necessary to be able to transmit commands to the sensor(s) via the connection and control board from the computer (for example, commands to direct the optical sensor, e.g. camera, in the direction of the antenna line-of-sight).

In a further embodiment of this aspect, the connection and control board may be configured to transmit commands to one or more sensors $202_1 \ldots 202_N$, which may comprise an optical sensor(s), to direct the sensors $202_1 \ldots 202_N$ in the direction of the antenna line-of-sight, for example.

In yet another embodiment, the system 200 can simultaneously execute any combination of the above means to determine whether the line-of-sight is blocked. Comparing the results of multiple tests may enable greater accuracy in detecting blockages.

If the software 210 determines that the line-of-sight is blocked, this data is used to generate commands for the CCB 206 to stop transmission. The computer 208 sends the commands to the CCB 206, which in turn directs the communication equipment 204 to stop transmitting the uplink signal (e.g., via modem or amplifier).

After the COTM transmission has been stopped, the communication equipment 204 continues to process data, as explained above, to enable the system 200 to determine whether the line-of-sight remains blocked. Once the software 210 determines the line-of-sight is free, this data is used to generate commands for the CCB 206 to resume transmission. The computer 208 sends the commands to the CCB 206, which in turn directs the communication equipment 204 to restart the uplink signal transmission (e.g., via modem or amplifier).

According to an embodiment of an aspect of the present invention, the system 200 is equipped with a buffer (not shown) to temporarily store transmission data while the signal transmission is temporarily stopped. In one embodiment of this aspect of the present invention, the buffer may be of a capacity to hold data associated with a transmission interruption of preselected duration, whereby a greater capacity would enable more data to be stored while transmission is suspended.

Potential blockages of COTM transmissions are predicted according to another aspect of the present invention. In one embodiment, the communication equipment 204, via a vehicle sensor(s), monitors the COTM vehicle's velocity and position. This data is then transmitted to the CCB 206, which in turn transmits the data to the computer 208.

According to another embodiment of an aspect of the present invention, one or more sensors $202_1 \ldots 202_N$ may comprise a vehicle sensor(s) that is distinct from the communication equipment 204 and is coupled to the CCB 206 in order to transmit data directly to the CCB 206. In one embodiment of this aspect, the vehicle sensor(s) may be a customized or off-the-shelf Global Positioning System ("GPS").

According to another embodiment, the computer 208 may comprise at least one database 212 to store 3-dimensional terrestrial maps, as are known in the art or may yet be developed, and which may include building information, and/or locations with microwave links. These maps, for example, may include information regarding the location and dimensions of various buildings in an urban area. The software 210 running on the computer 208 may be configured to determine, according to known methods, from the COTM vehicle's velocity, position, and the corresponding terrestrial data from the map, whether the line-of-sight will be blocked and within what timeframe such blockage will occur.

According to one embodiment, if the computer 208, running software 210, determines the line-of-sight will be blocked within a preselected timeframe, commands to stop uplink signal transmission is sent to the CCB 206, which in turn directs the communication equipment 204 to stop transmission (e.g., via modem or amplifier).

Using updated COTM vehicle velocity and position data, the computer 208, running software 204, in one embodiment uses the 3-dimensional terrestrial maps to determine when the line-of-sight is free. According to yet another embodiment, the computer 208, running software 204, determines when the line-of-sight is free by calculating actual blockages from (i) reflected wave data, (ii) received signal measurements, and/or (iii) optical sensor data, as detailed above.

Once the software 210 determines the line-of-sight is free, this data is used to generate commands for the CCB 206 to resume transmission. The computer 208 sends the commands to the CCB 206, which in turn directs the communication equipment 204 to restart the uplink signal transmission (e.g., via modem or amplifier). As explained above, according to an embodiment of an aspect of the present invention, the system 200 is equipped with a buffer to temporarily store transmission data while the signal transmission is temporarily stopped.

According to another embodiment of the present invention, if the computer 208, running on software 210, determines the line-of-sight will be blocked within a preselected timeframe, the computer 208, running software 210, uses the 3-dimensional map data to transmit information about the predetermined blockage and possible routes to avoid this predetermined blockage to a COTM vehicle operator. If the COTM vehicle route is changed, the system 200 predicts other potential blockages as detailed above.

According to yet another embodiment of an aspect of the present invention, the computer 208, running software 210, is configured to generate route plans for the COTM vehicle by using the 3-dimensional terrestrial maps located in one or more databases 212 and beginning and ending coordinates. This could minimize or eliminate the line-of-sight blockage during COTM transportation from one location to another.

Figure 3:
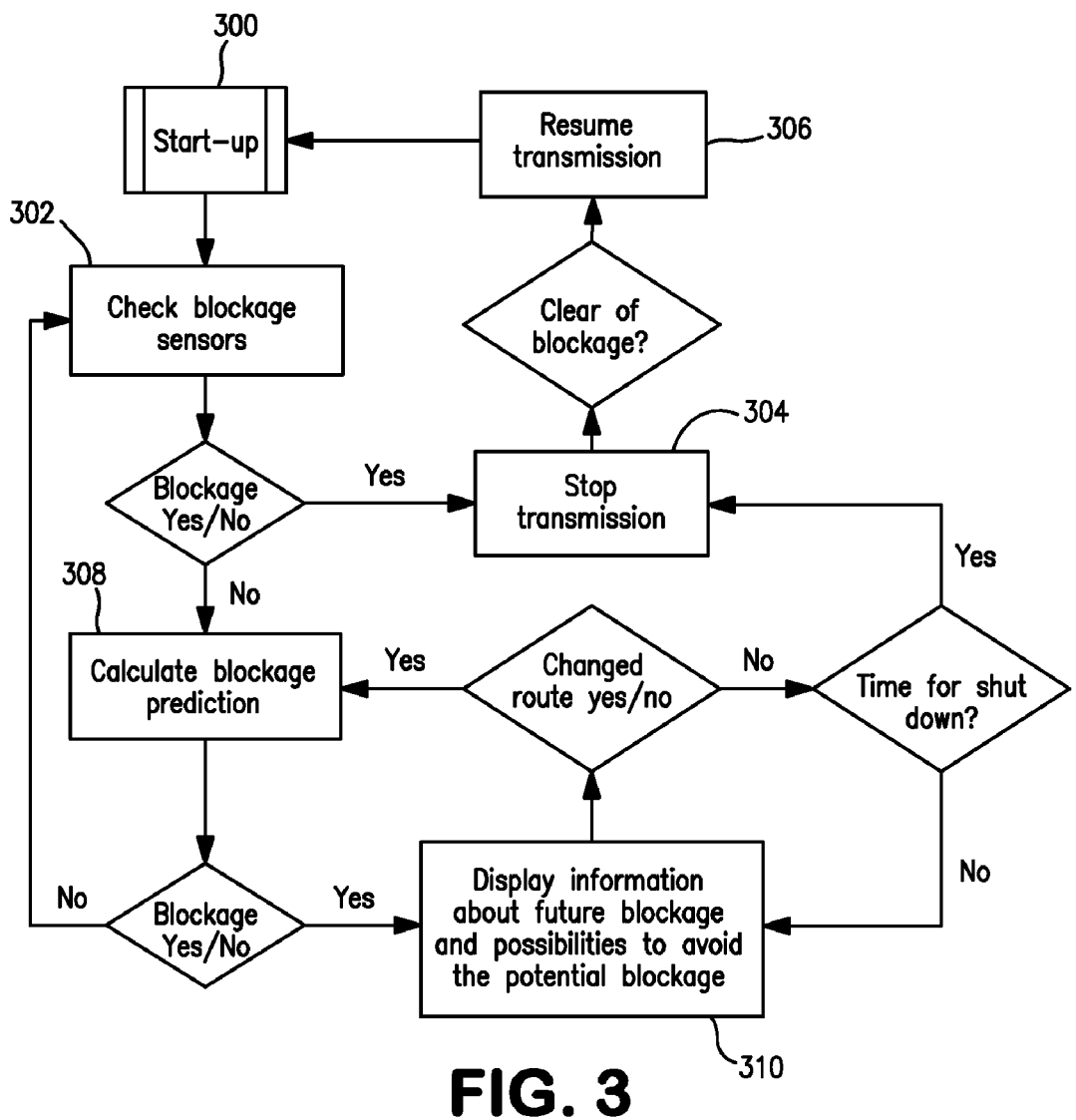
FIG. 3 shows, in flowchart form, steps associated with embodiments according to various aspects of the present invention.

An embodiment of a method according to the present invention is illustrated in FIG. 3. First, COTM transmission is started 300. Then, while the COTM vehicle is moving, the blockage detection and prevention system 200 (as shown in FIG. 2 or as otherwise configured to implement this method) calculates whether there is an actual obstacle blocking the line-of-sight 302. If there is, transmission is stopped 304, and once the system 200 determines the line-of-sight is free again, transmission is resumed 306. Otherwise, the system 200 calculates when future blockage will occur 308. If future blockages are not predicted, the system 200 calculates whether there is an actual obstacle blocking the line-of-sight 302 per the logic above. If future blockages are predicted, the computer 208, running software 210, transmits information about the future blockage and possibilities to avoid the blockage 310. If a COTM vehicle operator changes the vehicle route, the system 200 calculates when future blockages will occur 308 per the logic above. If the route is maintained, the transmission is stopped if the COTM vehicle will encounter the blockage within a preselected timeframe 304. Otherwise, the system 200 continues to relay future blockage information and alternate route data to the COTM vehicle operator 310.

Other objects, advantages and embodiments of the various aspects of the present invention will be apparent to those who are skilled in the field of the invention and are within the scope of the description and the accompanying figures. For example, but without limitation, structural or functional elements might be rearranged, or method steps reordered, consistent with the present invention. Similarly, sensors may comprise a single instance or a plurality of devices, such plurality possibly encompassing multiple sensor types. The sensor types described in various embodiments are not meant to limit the possible types of sensors that may be used in embodiments of aspects of the present invention, and other types of sensors that may accomplish similar tasks may be implemented as well. Similarly, processors or databases may comprise a single instance or a plurality of devices coupled by network, database or other information path. Similarly, principles according to the present invention, and systems and methods that embody them, could be applied to other examples, which, even if not specifically described here in detail, would nevertheless be within the scope of the present invention.

What is claimed is:

1. A system for predicting potential blockages of the line-of-sight between a communications-on-the-move ("COTM") antenna and a target satellite to mitigate interference caused by communications on-the-move, the system comprising:
a COTM antenna configured to transmit an uplink signal and receive a downlink signal;
communication equipment coupled to a connection and control board; and
a computer coupled to the connection and control board, wherein
the computer is configured to transmit data to the connection and control board;
the connection and control board is configured to transmit data to the communication equipment; and
the communication equipment is configured to perform at least one of the actions selected from the group consisting of (i) stopping transmission of the uplink signal, and (ii) starting transmission of the uplink signal, and
wherein the computer comprises a database comprising 3-dimensional terrestrial map data and is programmed to calculate whether an obstruction will enter the line-of-sight between the COTM antenna and the target satellite within a preselected timeframe from the database and vehicle data comprising velocity and location of a vehicle equipped with a COTM antenna.

2. The system according to claim 1 wherein the communication equipment comprises at least one of the group consisting of (i) antenna, (ii) modem, (iii) amplifier, (iv) communication transmitter and receiver, (v) beacon receiver, (vi) power detector, and (vii) sensor.

3. The system according to claim 2 wherein the sensor comprises at least one of the group consisting of (a) optical sensor and (b) vehicle sensor.

4. The system according to claim 1 wherein the communication equipment is configured to receive reflected wave data from the uplink signal.

5. The system according to claim 4 wherein the computer is programmed to calculate whether an obstruction is within the line-of-sight between the COTM antenna and the target satellite from the reflected wave data.

6. The system according to claim 1 wherein the communication equipment is configured to receive downlink signal data.

7. The system according to claim 6 wherein the computer is configured to calculate whether an obstruction is within the line-of-sight between the COTM antenna and the target satellite from the downlink signal data.

8. The system according to claim 1 wherein the communication equipment is configured to receive optical sensor data.

9. The system according to claim 8 wherein the computer is programmed to calculate whether an obstruction is within the line-of-sight between the COTM antenna and the target satellite from the optical sensor data.

10. The system according to claim 1 further comprising a sensor.

11. The system according to claim 10 wherein the sensor comprises at least one of the group consisting of (a) an optical sensor and b) a vehicle sensor.

12. The system according to claim 11 wherein the computer is programmed to calculate whether an obstruction is within the line-of-sight between the COTM antenna and the target satellite from optical sensor data collected by and transmitted from the optical sensor.

13. The system according to claim 11 wherein the communication equipment is configured to receive the vehicle data collected by and transmitted from the vehicle sensor.

14. The system according to claim 11 wherein the connection and control board is configured to receive the vehicle data collected by and transmitted from the vehicle sensor.

15. The system according to claim 11 wherein the computer is programmed to calculate whether an obstruction is within the line-of-sight between the COTM antenna and the target satellite from the vehicle data collected by and transmitted from the vehicle sensor.

16. The system according to claim 1 wherein the 3-dimensional terrestrial map data comprises building data.

17. The system according to claim 1 wherein the database comprises microwave link locations.

18. The system according to claim 1 wherein the computer is programmed to generate vehicle route data to mitigate blockage of the line-of-sight during COTM transportation from one location to another.

19. The system according to claim 1 further comprising a buffer.

20. The system according to claim 19 wherein the buffer comprises a capacity to hold data associated with a transmission interruption of preselected duration.

21. A method of predicting potential blockages of the line-of-sight between a communications-on-the-move ("COTM") antenna and a target satellite to mitigate interference caused by communications on the move, comprising the steps of:
   receiving vehicle data in connection with a vehicle equipped with a COTM antenna and a transmitter, wherein the vehicle data comprises vehicle velocity and vehicle location collected by and transmitted from a vehicle sensor; and
   calculating from the vehicle data and a database comprising 3-dimensional terrestrial map data whether the line-of-sight will be blocked within a preselected timeframe.

22. The method according to claim 21 further comprising the step of transmitting information about when the line-of-sight will be blocked if the line-of-sight will be blocked within a preselected timeframe.

23. The method according to claim 22 further comprising the step of altering the route of the vehicle to mitigate blockage of the line-of-sight during COTM transportation from one location to another in accordance with the information about when the line-of-sight will be blocked.

* * * * *

UNITED STATES PATENT AND TRADEMARK OFFICE
CERTIFICATE OF CORRECTION

PATENT NO.         : 8,050,628 B2
APPLICATION NO.    : 11/779242
DATED              : November 1, 2011
INVENTOR(S)        : Per Wahlberg et al.

It is certified that error appears in the above-identified patent and that said Letters Patent is hereby corrected as shown below:

<u>Title Page</u>
Assignee at INID Code (73) should read "OverHorizon (Cyprus) PLC"

Signed and Sealed this
Sixth Day of March, 2012

David J. Kappos
*Director of the United States Patent and Trademark Office*